(12) United States Patent
Hudson et al.

(10) Patent No.: US 8,758,861 B2
(45) Date of Patent: Jun. 24, 2014

(54) INSULATING GLASS SEALANT

(75) Inventors: John Michael Hudson, High Wycombe (GB); Mark John Bramwell, Addlestone (GB); Christopher Denis O'Kelly, High Wycombe (GB); Rodney Ralph Brooks, Whickham (GB)

(73) Assignee: Tremco Illbruck International GmbH, Cologne (DE)

( * ) Notice: Subject to any disclaimer, the term of this patent is extended or adjusted under 35 U.S.C. 154(b) by 1042 days.

(21) Appl. No.: 12/742,070

(22) PCT Filed: Nov. 7, 2008

(86) PCT No.: PCT/GB2008/003747
§ 371 (c)(1),
(2), (4) Date: May 13, 2011

(87) PCT Pub. No.: WO2009/060199
PCT Pub. Date: May 14, 2009

(65) Prior Publication Data
US 2011/0223429 A1 Sep. 15, 2011

(30) Foreign Application Priority Data
Nov. 8, 2007 (GB) .................................. 0721958.7

(51) Int. Cl.
*B05D 3/10* (2006.01)
(52) U.S. Cl.
USPC ........................................ 427/387; 427/385.5
(58) Field of Classification Search
None
See application file for complete search history.

(56) References Cited

U.S. PATENT DOCUMENTS

| 3,971,751 | A | 7/1976 | Isayama et al. |
| 5,118,290 | A | 6/1992 | Muller et al. |
| 5,346,940 | A | 9/1994 | Brassard et al. |
| 5,464,888 | A | 11/1995 | Owen |
| 6,265,517 | B1 | 7/2001 | Stuart |
| 6,310,170 | B1 * | 10/2001 | Johnston et al. ................ 528/38 |
| 6,679,018 | B2 | 1/2004 | Georgeau et al. |

(Continued)

FOREIGN PATENT DOCUMENTS

| EP | 0 269 819 | A2 | 6/1988 |
| EP | 1 279 709 | B1 | 1/2003 |
| WO | WO 95/26998 | A | 10/1995 |

*Primary Examiner* — Erma Cameron
(74) *Attorney, Agent, or Firm* — Birch, Stewart, Kolasch & Birch, LLP

(57) ABSTRACT

A two-part sealant composition, wherein this composition comprises a first part and a second part. The first part comprises a polymer selected from a silane-terminated polyurethane or a silane-terminated polyether, wherein this polymer is present in an amount of up to 100% by weight of the first part of the sealant composition. The second part comprises a plasticiser that it is compatible with the polymer and a filler comprising at least 0.5% by weight of residual water, wherein the filler comprises at least one rheological filler, and wherein the filler is present in an amount of 80-20% by weight of the second part of the sealant composition. The first and second parts are separated from one another, and the amount of polymer present in the first part makes up 4-50% by weight of the first and second parts taken together. In use, the first and second parts are mixed to achieve a cured substance having a 48 hour Shore A hardness in the range of 25-70.

2 Claims, 2 Drawing Sheets

(56) References Cited

U.S. PATENT DOCUMENTS

| | | |
|---|---|---|
| 2005/0101753 A1 | 5/2005 | Schindler et al. |
| 2007/0066768 A1* | 3/2007 | Gauthier et al. .............. 525/477 |
| 2007/0088137 A1 | 4/2007 | Georgeau et al. |
| 2007/0178256 A1 | 8/2007 | Landon |
| 2007/0237912 A1 | 10/2007 | Correia |
| 2008/0057316 A1* | 3/2008 | Landon et al. ............. 428/423.1 |
| 2009/0005498 A1* | 1/2009 | Lin et al. ....................... 524/588 |
| 2010/0197855 A1* | 8/2010 | Blom ............................ 524/589 |

\* cited by examiner

INSULATING GLASS SEALANT

FIELD OF THE INVENTION

The present invention relates to a two-part sealant composition and its use in insulating glass units.

BACKGROUND OF THE INVENTION

Insulating glass (IG) units, which are used in the manufacture of double glazed windows and doors, typically comprise two parallel sheets of glass held a small distance apart by a spacer bar. The small area between the two parallel sheets of glass, i.e. the cavity, is generally filled with air or an inert gas such as argon.

Conventional IG units typically use two types of sealants to assist in adhering the glass to the spacer bar, and this type of construction is known as dual-sealed. In such dual-sealed IG units, the first type of sealant used is the innermost, or 'primary', sealant. This 'primary' sealant is used to form a seal between the spacer bar and the glass, wherein this seal is inside the cavity between the two glass sheets. Conventionally the 'primary' sealant is a thermoplastic sealant based on polyisobutylene, and its function is to prevent moisture vapour from entering the cavity of the IG unit and causing condensation. In the case of a gas-filled IG unit, the 'primary' sealant also acts as a barrier to the escape of inert gas (typically argon) from the unit. The 'primary' sealant has little mechanical strength and relatively poor adhesion as compared to the cured version of the second type of sealant used in dual-sealed IG units.

Considering now the second type of sealant, this is the outermost sealant and is again used to form a seal between the spacer bar and the glass, but this time the seal is not inside the cavity between the two glass sheets but is on the other side of the spacer bar. This outermost, or 'secondary', sealant is conventionally a two-part sealant based on one of polysulphide, polyurethane or silicone. Thermoplastic one-part sealants based on butyl rubbers, however, have also been used for this purpose, as have "reactive" hot-melt sealants which are applied as thermoplastic materials but later post-cured by the action of atmospheric moisture.

By way of background, it is to be understood that two-part sealants form a seal by virtue of a curing mechanism that begins on contact of the two parts, whereas non-thermoplastic one-part sealants form a seal by virtue of a curing mechanism that begins when the sealant is released into the environment from its storage container, and thermoplastic one-part sealants form a seal when the sealant cools from the molten state.

Returning to the 'secondary' sealant, the principle function of this sealant is to provide mechanical strength to hold the IG unit together and prevent rupture of the 'primary' sealant during the normal thermal cycling (i.e. expansion and contraction with temperature) that is experienced by the unit. As such the "secondary" sealant plays a major part in ensuring that the IG unit can pass European Standard tests EN1279-2 and EN1279-3. The secondary sealant may additionally act as a moisture vapour and/or gas barrier, further improving the performance and service life of the IG unit. The secondary sealant needs to be strong and flexible, with excellent adhesion to glass and spacer bar materials—typically anodised aluminum, stainless steel, or occasionally plastic are used as spacer bar materials.

The materials currently used for 'secondary' sealants, however, have several disadvantages.

Looking first at the known two-part polyurethane sealants, these often contain crude 4,4'-methylene diphenyl diisocyanate (MDI) within their curing agent. This is harmful to health, and therefore polyurethane sealants must be labelled as Harmful. As a result, extra care must be taken during handling and transportation, as well as with regard to disposal of empty curing agent drums. Consequently the cost of using polyurethane sealants is high. In addition, polyurethane sealants often contain a small amount of an organo-mercury compound as a curing catalyst. This is highly toxic if handled during manufacture, and further the use of organo-mercury compounds is currently under threat by legislation, for example in the Netherlands. Polyurethane sealants also typically involve the handling of moisture-sensitive materials during their production process, and therefore some materials (for example mineral fillers) need to be thoroughly dried as part of the manufacturing process. This involves the use of heat and a vacuum, which are both expensive. In addition, if the drying step is performed as an integrated part of the overall production process, the mix may need to be subsequently cooled before carrying on with the process. This costs further time and money. If the drying is inadequate, the cure speed of the final mixed sealant may be affected.

Considering now the known two-part polysulphide sealants, these typically contain manganese dioxide and thiram (bis(dimethylthiocarbanoyl)disulphide) within their curing agent, and again therefore these sealants must be labelled as Harmful. Further, grinding of the manganese dioxide, which is necessary for the manufacture of the curing agent, carries the possibility of causing a violent exotherm and hence is potentially dangerous. Yet further, polysulphide polymers are themselves harmful to aquatic organisms, and some polysulphide sealants also contain harmful solvents.

Turning to the known two-part silicone sealants, these are very expensive and have poor moisture vapour resistance and argon retention. Consequently they are seldom used in the manufacture of domestic IG units.

Looking finally at the known one-part thermoplastic sealants based on butyl rubbers, these also have poor durability as compared with polyurethane or polysulphide systems. They are further expensive and require energy intensive heating systems for their application.

Given the above-described disadvantages of each of the conventional 'secondary' sealants used in IG units, there exists a need for an alternative 'secondary' sealant that is largely harmless to both the people manufacturing it and the environment, as well as unlikely to be restricted by impending legislation. Any new sealant must also be capable of being manufactured at a competitive price.

SUMMARY OF THE INVENTION

According to a first embodiment of the present invention, there is provided a two-part sealant composition comprising a first part and a second part. The first part comprises a polymer selected from a silane terminated polyurethane or a silane terminated polyether, wherein this polymer is present in an amount of up to 100% by weight of the first part of the sealant composition. The second part comprises a plasticiser that is compatible with the polymer and a filler comprising at least 0.5% by weight (as compared to the filler weight) of residual water, wherein the filler comprises at least one rheological filler and is present in an amount of 80-20% by weight of the second part of the sealant composition. The amount of polymer present in the first part makes up 4-50% by weight of the first and second parts taken together. The first and second parts are separated from one another, for instance during storage, but in use, the first and second parts are mixed to achieve a cured substance having a 48 hour Shore A hardness in the range of 25-70, with an especially preferred range of 35-60.

The two-part sealant composition of the first embodiment of the invention is useful as a 'secondary' sealant in IG units, and meets the key requirements of the EN1279 European Standard. Further, it requires no health and safety labelling or risk phrases, and hence presents fewer problems in use than other secondary sealants currently on the market (such as polyurethane and polysulphide sealants) which do require such labelling and phrases, and hence require concomitant precautions to be taken by the end users.

According to a second embodiment of the present invention, there is provided a process for achieving a cured sealant substance. This process comprises the steps of (a) applying a first part of a two-part sealant composition and a second part of a two-part sealant composition to a substrate, and (b) allowing the first part of the two-part sealant composition and the second part of the two-part sealant composition to cure by allowing a reaction between the first part and the second part to proceed. Typically, the first part and the second part of the two-part sealant are mixed together prior to application to the substrate. Preferably this pre-mixing occurs very shortly before application to the substrate (for example a few seconds before application on an automatic line, or up to 5 to 10 minutes before application on a manual line), and usually an integrated mixing/application machine is used.

As in the first embodiment, the first part comprises a polymer selected from a silane terminated polyurethane or a silane terminated polyether, wherein this polymer is present in an amount of up to 100% by weight of the first part of the sealant composition. The second part comprises a plasticiser that is compatible with the polymer and a filler comprising at least 0.5% by weight (as compared to the filler weight) of residual water, wherein the filler comprises at least one rheological filler and is present in an amount of 80-20% by weight of the second part of the sealant composition. The amount of polymer present in the first part makes up 4-50% by weight of the first and second parts taken together.

According to a third embodiment of the present invention, there is provided a cured sealant obtainable by the process as described in the second embodiment.

According to a fourth embodiment of the present invention, a two-part sealant composition according to the first embodiment is used in an insulating glass structure.

According to a fifth embodiment of the present invention, there is provided a window or door unit comprising the cured sealant substance of the third embodiment.

BRIEF DESCRIPTION OF THE DRAWINGS

FIG. 1b shows an expanded perspective drawing of part of the IG unit of FIG. 1a.

Figure 1A:
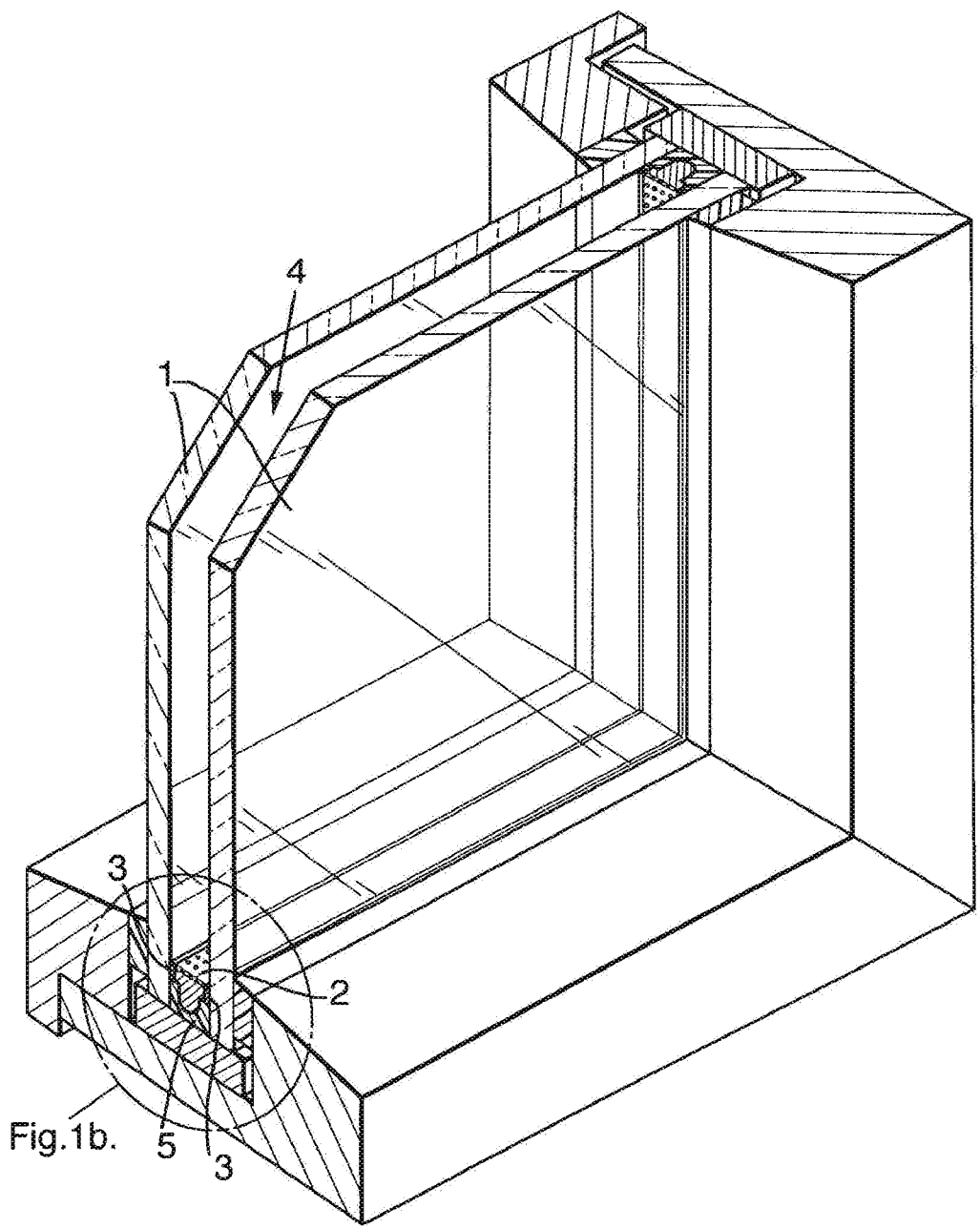
FIG. 1a shows a perspective drawing of a conventional IG unit, incorporating a cured sealant composition according to the invention.
Figure 1B:
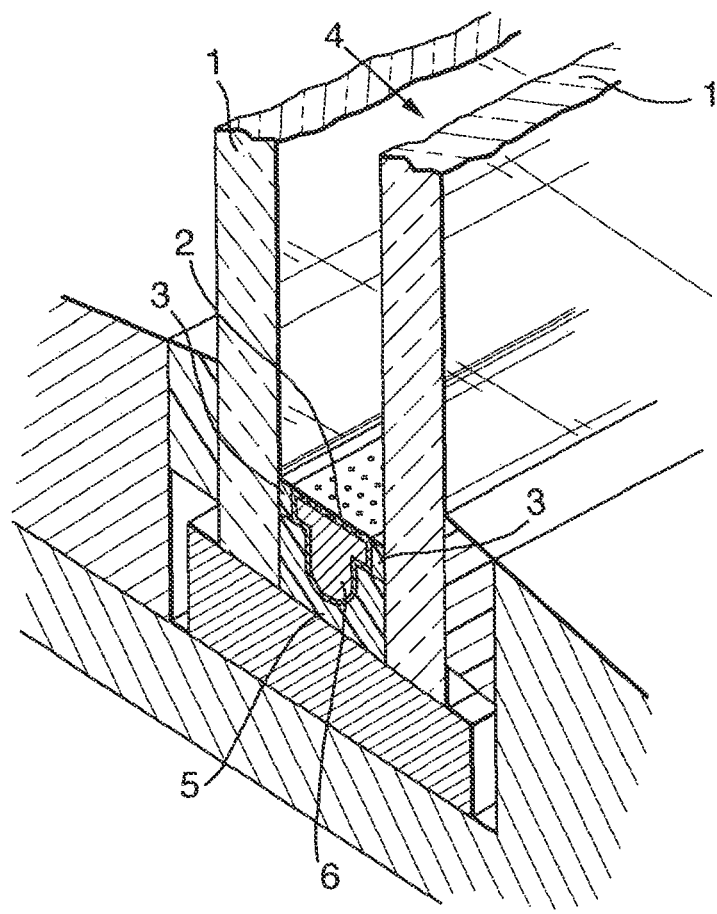
Figure 2:
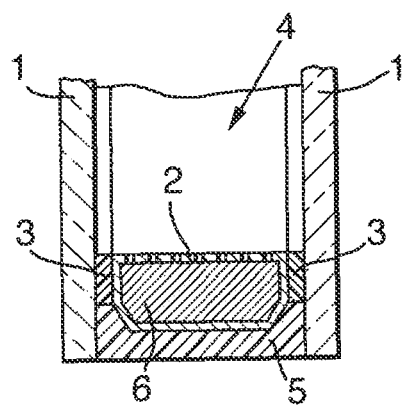
FIG. 2 shows a cross-sectional view of another conventional IG unit, incorporating a cured sealant composition according to the invention.

Looking in detail at FIGS. 1a and 1b, and 2, these show two parallel glass sheets 1 with a spacer bar 2 inbetween, which may be made of metal or plastics material. A spacer bar will separate the glass sheets at all four edges of the unit. A primary sealant 3 is present between each spacer bar 2 and each glass sheet 1, adjacent to the cavity 4. A secondary sealant 5 is present between each glass sheet 1 and each spacer bar 2, not adjacent to the cavity 4. The secondary sealant is the cured sealant composition of the invention. Each spacer bar 2 is hollow, and at least one spacer bar is wholly or partially filled with a desiccant material 6. The or each spacer bar containing desiccant material is perforated at least along the surface adjacent to the cavity 4, so as to allow the desiccant material to absorb moisture from the cavity, thereby maintaining a dry atmosphere in the cavity and preventing condensation in the IG unit. The desiccant material is typically a beaded molecular sieve or silica gel, or a mixture of the two.

DETAILED DESCRIPTION OF THE INVENTION

The two-part sealant composition of the present invention comprises a first part, wherein this first part comprises a polymer selected from a silane terminated polyurethane or a silane terminated polyether. The polymer is typically a liquid. The polymer gives rise to a cured sealant having a 48-hour Shore A hardness of 25-70, preferably 35-60. This Shore A hardness ensures that the sealant adequately serves its function of preventing movement within the IG unit. The Shore A hardness is determined in accordance with the method described in the "Methods" section of this specification.

The polymer is present in an amount of up to 100% by weight of the first part, such that the amount of polymer present makes up 4-50% by weight, more preferably 5-20%, and most preferably 10% by weight of the first and second parts of the sealant composition taken together. Preferably the first part of the two-part composition consists essentially of polymer, and more preferably consists solely of polymer. When the first part consists solely of or consists essentially of polymer, the first part is in the form supplied by the manufacturer, with no further processing or mixing required prior to delivery to the end user (compounding). This reduces the processing cost and speeds manufacture of the two-part composition. Further it avoids the need for the polymer to be extensively handled, and hence increases shelf life by reducing contamination or the inadvertent incorporation of atmospheric moisture.

Preferably the polymer is a telechelic polymer (i.e. a polymer carrying at least one functionalised end group that has the capacity for selective reaction to form bonds with another molecule). More preferably the polymer is a telechelic polymer with difunctional or trifunctional end groups. Even more preferably both ends of the polymer have at least one functionalised end group, and most preferably both ends of the polymer have trifunctional end groups. Preferably the terminal functionalities are alkoxy groups, such that difunctional end groups give rise to two alkoxy groups pendant from the Si atom in a silane terminating group, and such that trifunctional end groups give rise to three alkoxy groups pendant from the Si atom in a silane terminating group. Preferably the polymer is of a low viscosity, for example 5,000-35,0000 mPas at 25° C. Typically the alkoxy group content of the polymer is 0.35-0.70 mmol/g, and preferably it is 0.35-0.70 mmol/g. More preferably the alkoxy group content is 0.50-0.70 mmol/g. Most preferably the alkoxy group content is a methoxy group content. High levels of alkoxy functionality and low viscosity are believed to contribute to the advantageous 48 hour Shore A hardness of the cured sealant product.

Examples of suitable polymers include Polymer ST61, Polymer ST75 and Polymer ST77 supplied by Hanse Chemie; Geniosil STP E10, Geniosil STP E15, Geniosil STP E30 and Geniosil STP E35 supplied by Wacker; Desmoseal SXP 2662, Desmoseal SXP 2458 and Desmoseal SXP 2636 supplied by Bayer; and Spur+* 1010 LM, Spur+* 1050 LM and Spur+* 1015 LM supplied by Momentive. Preferred polymers are Spur+* 1050 LM supplied by Momentive; and Geniosil STP E15 and STP E35 both supplied by Wacker. The most preferred polymer is Geniosil STP E15.

The two-part sealant composition of the present invention also comprises a second part, and this second part comprises a plasticiser and a filler. Looking first at the plasticiser, this must be compatible with the polymer and by this we mean that it will mix into the system without bleeding back out. The plasticiser has the function of softening and extending the final cured polymer network, and providing extra liquid components so that the mineral fillers are fully wetted-out. The plasticiser can be present in any amount sufficient to fulfil this purpose. Typical amounts of plasticiser are 20-40% of the second part, preferably 25-35% of the second part. Suitable plasticisers are derivatives of benzoic acid, phthalic acid (eg. phthalates, such as dibutyl-, dioctyl-, dicyclohexyl-, diisooctyl-, diisodecyl-, dibenzyl- or butylbenzyl phthalate), trimellitic acid, pyromellitic acid, adipic acid, sebacic acid, fumaric acid, maleic acid, itaconic acid and citric acid, and derivatives of polyester, polyether and epoxy and the like. Preferred plasticisers are alkyl esters for example phthalates, adapates, sebacates and benzoates. An especially preferred example is Jayflex DNIP supplied by Exxon. Liquid polybutene materials may also be used, as may Castor Oil or similar natural products.

With regard to the filler, this can be any substance containing at least 0.5% by weight (of the filler) of water (to initiate cure of the two-part composition) and which comprises a rheological filler. A rheological filler is one which imparts the property of thixotropy to both the second part of the sealant of the invention, and to the sealant comprising the first and second parts combined. A material is thixotropic if it will flow under the application of shear force, then set up and retain its shape once the shear force is removed.

Preferred rheological fillers are precipitated calcium carbonates, for example having an average size within the range of 40-70 nm, and/or a specific surface area of 20-35 $m^2/g$. Alternative rheological fillers such as fumed silicas, bentonites and other clays can however also be used.

It is preferable that when the rheological filler is precipitated calcium carbonate, the precipitated calcium carbonate is coated (eg. during manufacture) for example with calcium stearate (or a similar material that can impart full or partial hydrophobicity to the particles). The nature and quality of this coating influences rheology, since the amount of residual hydrophobicity governs the level of structuring that the filler imparts on the sealant, and further the coating prevents the filler from absorbing key raw materials of the formulation and rendering them ineffective. It is preferable that the precipitated calcium carbonate has a coating level of 0-3.5% of the filler weight.

Preferably the filler also comprises a non-rheological filler to reduce the amount of rheological filler present and thus reduce cost, and this non-rheological filler can be any of the commonly used mineral fillers, for example ground calcium carbonate or talc. Ground calcium carbonate is preferred, and it is preferable to coat the ground calcium carbonate, typically with calcium stearate or similar material that can impart full or partial hydrophobicity to the particles.

When the filler comprises a mixture of precipitated calcium carbonate and ground calcium carbonate, the amount of precipitated calcium carbonate in the composition is preferably 10-100%, more preferably 20-80%, even more preferably 20-50%, and most preferably about 25%, by weight of the total amount of filler. Most preferably the amount of precipitated calcium carbonate in the composition is about 57% by weight of the total amount of filler. The amount of ground calcium carbonate in the composition is 0-90%, more preferably 20-80%, even more preferably 30-60%, and most preferably about 47%, by weight of the total amount of filler. Most preferably the amount of ground calcium carbonate in the composition is 43% by weight of the total amount of filler.

The total amount of filler, whether or not composed of ground and precipitated calcium carbonate, preferably amounts to 55-75% by weight of the two-part sealant composition. Amounts below 55% can sometimes give rise to a composition with an inadequate solid network that is too soft, and amounts above 75% can sometimes give rise to an undesirable precipitate and/or can become dry and crumbly, particularly if the critical pigment volume concentration (PVC) is exceeded.

Examples of suitable precipitated calcium carbonates include Winnofil SPT Premium, Winnofil SPM, Socal 322 and Socal 312 (all produced by Solvay); Neolight SS and Neolight SP (produced by Takehara); Calofort SM and Calofort SE (produced by Speciality Minerals); and Hakuenka CCR, Hakuenka CCR-S, Hakuenka CC and Viscolite OS (all produced by Shiraishi Kogyo Kaisha Ltd). Of these precipitated carbonates, Winnofil SPT Premium, Winnofil SPM, Calofort SM, Neolight SS, Socal 312, Calofort SE, Socal 322, Hakuenka CCR-S and Hakuenka CC are preferred. Winnofil SPT Premium, Winnofil SPM, Calofort SM, Neolight SS, Socal 312 and Calofort SE are more preferred. Winnofil SPT Premium is most preferred.

Examples of suitable ground calcium carbonates include Omya BLR3, Britomya BSH, Omya F6, Omya F7, Omya F8 and Omya F9 (all produced by Omya); Microcarb ST-10, Microcarb ST-10H, Microcarb MC30 HE, and Microcarb ST90 (all produced by Minelco); and Carbital 110S, Carbital SB, Cretaplast 37, Cretaplast 67, Honcal 1T, Imerseal 50, Imerseal 75, Polcarb 40S, Polcarb 50S, Polcarb 60S, Polcarb S, and Polcarb SB (all produced by Imerys). Of these ground carbonates, Omya BLR3, Microcarb ST-10, Britomya BSH, Polcarb 50S and Carbital 110S are preferred, and Microcarb ST-10 is most preferred.

The second part of the two-part sealant composition can also contain UV absorbers/stabilisers (for example Uvasorb HA supplied by 3V International SA or Tinuvin 765 supplied by Ciba); antioxidants (for example Irganox 245 or 1135 both supplied by Ciba); colour pigments or dyes (for example a carbon black, one example of which is Printex V supplied by Grohlman; or a tin dioxide, one example of which is Kronos 2300 supplied by Kronos Ltd); adhesion promoters (for example Silquest A1110 supplied by Momentive Performance Materials); cross linkers (for example Silquest A1110 supplied by Momentive Performance Materials); density modifiers (for example Expancel DE20 supplied by Boud Marketing Ltd); rheology modifiers, such as modified castor waxes (for example the Crayvallac range from Cray Valley SA); or reaction catalysts (for example a tin catalyst, one example of which is Tinstab BL277 supplied by Polyone Co. Ltd). Further additives can be used to reduce plasticiser bleed-out (syneresis), for example a polyisobutylene could be added (for example Hyvis 30 supplied by Honeywell & Stein).

The second part of the two-part sealant composition is not dried during manufacture, and hence the filler in this second part contains residual moisture. The amount of residual water in the filler is at least 0.5% by weight of the filler. It is this residual water that is used to cure the two-part composition to form the cured product, once the two parts of the composition are brought together. Since no drying step is required, process costs and manufacture time are reduced since the process contains fewer steps and expensive drying agents (for example monoisocyanates such as Trixene ASF supplied by Baxenden Chemical Co) are not required.

The two-part composition of the present invention can be used in conventional IG sealing equipment, with only the ratio of the first and second parts needing to be adjusted if the rheology of the composition needs altering. Suitable ratios of first to second parts are 1:20-1:5 by weight, with about 1:10 being preferable. Such settings are however usually manufacturer-determined and are not adjustable by the end user. Further there are minimal cross-contamination issues with conventional polyurethane or conventional polysulphide two-part sealants, hence rapid change-over to the sealant of the present invention can be effected.

As mentioned above, the two-part composition of the invention is cured by bringing the first part and the second part of the composition together, and allowing the residual moisture in the second part to initiate crosslinking of the polymer in the first part. This crosslinking can be further encouraged by addition of an adhesion promoter or cross-linker (such as Silane A1110 and Silane A171 both supplied by Momentive Performance Materials) into the second part of the composition.

Once the cross-linking is initiated, the time to 10% cure is typically 0-60 minutes, preferably 10-50 minutes and most preferably 20-40 minutes. The time to 60% cure is typically 20-100 minutes, preferably 30-80 minutes and most preferably 30-60 minutes. The time to 90% cure is typically 40-200 minutes, preferably 80-200 minutes and preferably 80-120 minutes. The method used to establish these values is set out below in accordance with the method described in the "Methods" section of this specification.

The Wallace work life of a two-part composition according to the invention is typically 0-60 minutes, preferably 10-50 minutes, and most preferably 20-40 minutes. The 4 hour Shore A is typically 10-50, preferably 15-40, and the 24 hour Shore A is typically 20-80, preferably 30-70 and most preferably 35-60. The methods used to establish these values are set out in accordance with the method described in the "Methods" section of this specification.

The Viscosity (Helipath Viscosity) of the Second Part of the two-part composition of the invention is typically 400-1000 Pas, preferably 450-900 Pas, most preferably 500-800 Pas. The Bingham Yield Stress is typically 900-1800 Pa, preferably 1000-1600 Pa, and preferably 1200-1500 Pa. The Bingham Limiting Viscosity is typically 50-300 Pas, preferably 75-200 Pas, and most preferably 80-150 Pas. The methods used to establish these values are set out below in accordance with the method described in the "Methods" section of this specification.

Once the two-part composition of the invention has fully cured, the 48 hour Shore A hardness is in the range of 25-70, preferably 35-60. The Modulus at Failure is typically 0.4-2.0 MPa, preferably 0.5-1.5 MPa, and most preferably 0.6-1.0 MPa. The Strain at Break is typically 20-100%, preferably 40-90%, most preferably 50-70%. The methods used to establish these values are set out below in accordance with the method described in the "Methods" section of this specification.

For completeness, it should be noted that one-part sealants were also experimented with in order to solve the above-described problems. Examples of one-part sealants which satisfied the EN1279 European Standard and required no health and safety labelling were discovered, however the through-cure of these one-part sealants was too slow for them to be commercially successful in the IG field. In the one part sealants experimented with, all of the above-mentioned considerations and requirements regarding constituents apply mutatis mutandis, save that the constituents are obviously all mixed together and not separated into two parts, and that the filler and any other 'wet' ingredients need to be dried prior to manufacture of the composition in order to prevent premature cure.

The two-part sealants of the present invention are used to make IG units for use in windows and doors. Specifically, two sheets of glass are held in a substantially parallel arrangement, separated by a spacer bar. A primary sealant is introduced to the innermost join between the spacer bar and the glass sheets, and the two-part secondary sealant of the present invention is introduced at the outermost join between the spacer bar and the glass panels. The secondary sealant is allowed to cure and form a sealed IG unit, and then this IG unit is used to make a window or door, for example a patio door.

Methods

Maximum Load at Failure, Modulus at Failure, and Strain at Break:

These measurements are carried out on a standard H-block (as described in EN1279-4-see Annex A Section A.1). A specimen is made from two pieces of glass measuring 75×12×6 mm. This specimen is then held at each end with spacer blocks measuring 12 mm cubed leaving a 50×12×12 mm cavity that is filled with de-aerated sealant. Once the material has cured the spacer blocks are removed and the specimen is tested.

The specimen is inserted into a tensile test apparatus such as an Instron device. The two pieces of glass are pulled apart at a slow speed, eg. 5 mm per minute, and the load required to extend the material is plotted on a stress/strain curve. When the material ruptures the Maximum Load applied to the specimen at Failure can be determined.

To calculate the Modulus at Failure the Maximum Load at Failure is simply divided by the cross-sectional area of the sealant bead (12×50 mm).

The Strain at Break is a measure of the level of extension a specimen achieves before failure, and is expressed as a percentage calculated according to the following formula:

$$\frac{100 \times (\text{final length} - \text{initial length})}{\text{initial length}}$$

Wallace Work Life:

Wallace Work Life is a method of determining an approximate length of time that a material is "workable". That is, when the material is still of low enough viscosity to allow it to be tooled into a cavity. This method uses a piece of equipment known as the Wallace Shawbury Curometer.

The Curometer utilises a needle with small holes cut into it so that it is contained within an enclosed temperature controlled cell. This cell is filled with the sealant under test. This needle is then driven back and forth through the sealant at a medium rate over a very small distance. The resistance to movement of the needle is translated to a driven pen that draws a line on a slowly rotating drum over which is stretched a piece of time-graduated paper. The rotation of the drum is of a precise speed to coincide with the graduation on the paper. The pen draws a chart with the numerous strokes over the paper and the shape and speed of the cure profile of the material can be mapped.

The Wallace Work Life is gained by drawing a line parallel with the open time at the beginning of the curve, (usually a horizontal line showing a chain extension and little cross link formation) and a line parallel with the fast cure slope when cross linking has taken over from chain extension as the main reaction. The intersection of these two lines and the time it corresponds to on the graduated paper is the Wallace Work Life.

Times to 10%, 60%, 90% Cure:

These are read directly from the chart drawn as a result of the rotating drum in the Wallace Work Life Method.

Helipath Viscosity:

This test is a simple method for the determination of the viscosity of very viscous materials such as the second part of the two-part composition of the invention. It uses a Brookfield HBT Viscometer with a Helipath attachment and a T-bar spindle. (Spindle D from the Brookfield range).

The spindle is attached to the viscometer which rotates the bar at a known speed (10 rpm). The viscometer measures the resistance to rotation and this is translated to a measuring device. The Helipath attachment slowly lowers the spindle into the material so that the spindle is turning through undisturbed material at all times. If this were not the case the spindle would simply cut through the material leaving a spindle shaped hole in the bulk and hence giving a false result. The measurement is taken when the reading on the scale stabilises and a conversion calculation (according to the Brookfield manual) is carried out to yield a value of viscosity.

Bingham Yield Stress & Bingham Limiting Viscosity:

Bingham Yield Stress and Bingham Limiting Viscosity are derived from a mathematical model (Bingham Model) that is fitted to a rheological measurement undertaken on the material. This is carried out by a cone and plate rheometer such as a Bohlin CVO. The yield stress is a measurement of the force required to make the material change from a structured solid-like material to one showing liquid-like characteristics and back again. The viscosity is a measure of the amount of resistance to flow a material exhibits once it is in a liquid-like form.

A shear sweep is carried out on the material where the material is put through a series of shear stresses in a loop type test and the resistance to flow at each is measured. The material for instance may be sheared from 0-3000 Pa and then from 3000-0 Pa. The data is then plotted on a stress/strain chart. The data from the return set of data is the data fitted to the model.

Bingham Yield Stress provides information on the pressures needed to pump material from the drum and its slump characteristics once applied. Bingham Viscosity provides information on the pressures needed to pump material through the mixing and application machinery.

Boeing Jig Slump:

This is a method developed by Boeing. It is a method of determining the level of slump a material will exhibit on application.

The jig is a slab of steel that can be stood on its end. It incorporates a cut out section of circular shape of diameter 37 mm and depth of 5 mm. A disk of steel backs this area on a sliding mechanism. The slider is pulled back to enable the cut out section to be filled with sealant. The jig is then stood on its end and the slider is pushed out. This forces the bulk of sealant in the cut away section to stand proud of the jig. The level of slump of the material in mm can then be read from graduations cut into the jig.

% Cohesive: % Adhesive Failure:

When the specimen fails it can usually be visually observed how the sealant failed. If the sealant failed by splitting through the middle, or by leaving even a very thin coating of sealant on both sides of the failure, then this is known as a cohesive failure as the adhesion of the material was not compromised.

If the material failed at the sealant-substrate interface leaving a clean substrate this is known as adhesive failure as the bond between sealant and substrate has failed.

The visually determined amount of each failure type is used to determine a ratio of the two failure types, and this is used as an indication of the level of adhesion of the material.

Shore Hardness:

The hardness of plastics is most commonly measured by the Shore test. This method measures the resistance of plastics toward indentation and provides an empirical hardness value that does not necessarily correlate well to other properties or fundamental characteristics. The Shore A scale is used for "softer" plastics and rubbers while the Shore D is used for "harder" ones.

The Shore hardness is measured with an apparatus known as a Durometer and consequently is also known as "Durometer hardness". The hardness value is determined by the penetration of the Durometer indenter foot into the sample. Because of the resilience of rubbers and plastics, the indentation reading may change over time—so the indentation time is sometimes reported along with the hardness number.

In our case, we use a standard Shore A durometer which applies a force of 822 grammes to a hardened steel foot in the shape of a truncated 35° cone, 0.79 mm in diameter. The force is applied for one second and the hardness is read off the dial. Shore hardness is a dimensionless quantity, and there is no simple relationship between a material's hardness on one scale, and its hardness on any other scale, or by any other hardness test.

4-hour, 24-hour and 48-hour versions of the test refer to the curing time that the material is allowed before the hardness is measured.

Tack-free Time:

This is the time needed for the material to cure to the extent that touching the surface of the material no longer leads to uncured sealant being transferred to the fingers. In practice, it is the time at which partially-cured IG units can be handled. As such, the Tack-free Time is measured by touching a sample at intervals, until no transfer to the fingers is detectable to the person touching the sample.

The invention will now be illustrated by way of the following examples:

EXAMPLES

Examples 1 to 3 within the Scope of the Invention

The compositions of three 2-component sealants are listed below. For each, the ratio of the first part to the second part in the final composition is 1:10 by weight, and 1:6 by volume.

First Part for each of Examples 1 to 3: Geniosil STP-E15 100% by weight

Second Part, see below:

|  | Example 1 in % by weight | Example 2 in % by weight | Example 3 in % by weight |
|---|---|---|---|
| Jayflex DINP | 20.56 | 12.14 | 11.21 |
| Castor Oil | 0.00 | 12.14 | 11.21 |
| Hyvis 30 | 8.80 | 0.00 | 0.00 |
| Uvasorb HA29 | 0.06 | 0.06 | 0.06 |
| Irganox 245 | 2.00 | 0.00 | 0.00 |
| Irganox 1135 | 0.00 | 1.97 | 2.15 |
| Printex V | 1.00 | 0.98 | 1.00 |
| Crayvallac E 20831 | 0.00 | 2.11 | 2.15 |

-continued

|  | Example 1 in % by weight | Example 2 in % by weight | Example 3 in % by weight |
|---|---|---|---|
| Winnofil SPT-P | 40.00 | 28.33 | 25.00 |
| Microcarb ST-10 | 29.28 | 42.09 | 47.00 |
| Tinstab BL77 | 0.07 | 0.07 | 0.07 |
| Silane A1110 | 0.15 | 0.12 | 0.15 |

The properties of the compositions of Examples 1 to 3 as compared with a conventional polyurethane two-part sealant, JS 442 supplied by Tremco Illbruck are set out below:

Cure Properties

| Composition | Wallace Work Life | 10% Cure (mins) | 60% Cure (mins) | 90% Cure (mins) |
|---|---|---|---|---|
| Example 1 | 23 | 24 | 42 | 80 |
| Example 2 | 20 | 25 | 49 | — |
| Example 3 | 16 | 19 | 40 | — |
| JS442 | 32 | 33 | 35 | 55 |

| Composition | Tack-Free Time (mins) | 4 hr Shore A | 24 hr Shore A |
|---|---|---|---|
| Example 1 | 45 | 36 | 46 |
| Example 2 | 55 | 15 | 35 |
| Example 3 | 45 | 18 | 36 |
| JS442 | 80 | 40 | 52 |

Rheology

| Composition | Bingham Yield Stress (Pa) | Bingham Limiting Viscosity (Pas) | Helipath Viscosity (Pas) | Boeing Jig Slump (mm) |
|---|---|---|---|---|
| Example 1 | 1170 | 118 | 912 | 0 |
| Example 2 | 1407 | 86 | 544 | 0 |
| Example 3 | 1585 | 95 | 554 | 0 |
| JS442 | 1182 | 111 | 800 | 0 |

Adhesion
Glass Adhesion

| Composition | Max load at Failure (N) | Modulus at Failure (MPa) | Strain at Break (%) | % Coh:% Adh Failure |
|---|---|---|---|---|
| Example 1 | 618.19 | 0.99 | 55.99 | 100:0 |
| Example 2 | 390 | 0.65 | 56 | 100:0 |
| Example 3 | 366 | 0.61 | 68 | 100:0 |
| JS442 | 665.25 | 1.06 | 68.34 | 100:0 |

Aluminum Adhesion: All compositions tested met the requirements of EN1279-6.

Example 4—Not within the Scope of the Invention

The composition of a 1-component sealant, which was found to have through-cure too slow for the IG field, is listed below:

|  | % by weight |
|---|---|
| Polymer 627 | 9.91 |
| DNIP | 24.64 |
| Neolight SS | 30.8 |
| Carbital 110S | 28.13 |
| Kronos 2300 | 2.95 |
| Expancel DE20 | 0.48 |
| Trixene ASF | 2.14 |
| Tinuvin 765 | 0.11 |
| Irganox 1076 | 0.05 |
| Silane A171 | 0.54 |
| Silane A1110 | 0.66 |
| Tinstab BL277 | 0.24 |

The invention claimed is:

1. A process for forming a substance for use as a sealant with Insulating Glass (IG) units comprising the steps of:
   (a) applying a first part of a two-part sealant composition and a second part of a two-part sealant composition to a substrate; wherein
   the first part comprises a polymer selected from a silane terminated polyurethane or a same terminated polyether; wherein this polymer present in an amount of up to 100% by weight of the first part of the sealant composition; and wherein
   the second part comprises a plasticiser that it is compatible with the polymer and a filler comprising at least 0.5% by weight of residual water, wherein the tiller comprises at least one rheological filler, and wherein the filler is present in an amount of 80-20% by weight of the second part of the sealant composition; and
   wherein the amount of polymer present in the first part makes up 4-50% by weight of the first and second parts taken together, and
   (b) allowing the first part and the second part to cure by allowing a reaction between the first part and the second part to proceed, and form a cured insulating glass sealant substance wherein the cured sealant substance has a 48 hour Shore A hardness in the range of 25-70, a Modulus of Failure in the range of 0.4-2.0 mPa, and a Strain at Break in the range of 20-100%:
   where the twp-part sealant composition has a Wallace work life of 0-60 minutes.

2. A process according to claim 1, wherein the curing composition has a 4 hour Shore A hardness in the range of from 10-50.

* * * * *